United States Patent [19]
Wirtz

[11] 3,825,813
[45] July 23, 1974

[54] MULTI-PHASE THYRISTOR INVERTER CIRCUIT

[75] Inventor: Rainer Wirtz, Unterriexingen, Germany

[73] Assignee: Robert Bosch GmbH, Stuttgart, Germany

[22] Filed: July 16, 1973

[21] Appl. No.: 379,849

[30] Foreign Application Priority Data
Aug. 10, 1972  Germany.............................. 2239396

[52] U.S. Cl................................. 321/5, 321/45 C
[51] Int. Cl............................................ H02m 7/52
[58] Field of Search......................... 321/5, 45 C

[56] References Cited
UNITED STATES PATENTS

| | | | |
|---|---|---|---|
| 3,399,336 | 8/1968 | Koppelmann............................ | 321/5 |
| 3,406,325 | 10/1968 | Rosa.................................. | 321/45 C |
| 3,460,021 | 8/1969 | Schlabach................................ | 321/5 |
| 3,525,100 | 8/1970 | Duff................................... | 321/45 C |
| 3,555,397 | 1/1971 | Frank................................. | 321/45 C X |
| 3,588,667 | 6/1972 | Duff et al........................ | 321/45 C X |
| 3,733,539 | 5/1973 | Wirtz................................ | 321/45 C |

FOREIGN PATENTS OR APPLICATIONS

| | | | |
|---|---|---|---|
| 647,560 | 5/1963 | Belgium............................. | 321/45 C |
| 1,513,965 | 9/1969 | Germany............................ | 321/45 C |
| 1,513,964 | 9/1969 | Germany............................ | 321/45 C |

*Primary Examiner*—William M. Shoop, Jr.
*Attorney, Agent, or Firm*—Flynn & Frishauf

[57] ABSTRACT

To provide for better high speed performance of motors which are connected to a multi-phase thyristor inverter, the thyristor inverter has separate return feed lines, isolated from the supply source by diodes, and separate groups of return feed thyristors which are energized after cut-off of the main current supplying thyristors, to conduct stored energy fed back into the supply source through the separate lines and diodes after cut-off of the conducting thyristors.

12 Claims, 3 Drawing Figures

MULTI-PHASE THYRISTOR INVERTER CIRCUIT

Cross reference to related U.S. Pat. No. 3,733,539.

The present invention relates to a multi-phase thyristor inverter in which a d-c supply is chopped to provide multi-phase output, particularly to supply an asynchronous three-phase motor.

A thyristor inverter has been proposed to provide three-phase a-c for three-phase asynchronous motors from a d-c supply, in which two quenching circuits are provided, each with one commutating capacitor, as well as additional commutating chokes in order to provide for proper quenching of the thyristor in the inverter circuit. If such a circuit is used to drive a three-phase asynchronous machine at very high speed, then difficulties have been experienced in commutation. Upon commutation, the commutating energy must first be transferred from the commutating capacitor to the associated commutating inductance, or commutating choke, and re-stored in the commutating inductance. After recharging of the commutating capacitor in opposite direction, the inductance feeds back its energy only partly to the asynchronous machine; the greater part of the energy is returned to the source, typically a battery. This sequence results in losses, and further, a subsequent thyristor can be fired only after extinction of a first thyristor, and when the commutating capacitor has completely changed charged state. The discharge and recharge time of the capacitor is determined by the inherent frequency of the series tuned circuit formed by the commutating capacitor and the commutating inductance. The maximum possible switching time of each phase is decreased by this discharge-recharging time. At high speeds, the maximum power of the asynchronous machine is thus limited and may decrease rapidly. It is an object of the present invention to inprove thyristor inverter of the type described, so that it can supply asynchronous machines with current, even at high speeds, and without any substantial loss in power.

SUBJECT MATTER OF THE PRESENT INVENTION:

Briefly, the separate phases are connected over return feed thyristors to a positive and negative return feed line, separately, which return feed lines are isolated from the battery by a diode each. The thyristors are quenched not by inhibiting battery voltage to the anode, but rather, by supplying a counter voltage to the cathode. The commutating inductances which are necessary for a-c isolation of the return feed lines can thus be omitted. Upon commutation, it is no longer necessary to change the direction of current in the commutating inductance. This permits greater speed in discharging and recharging the commutating capacitor, and no delay time between extinction or quenching of a thyristor and firing of the subsequent thyristor arises. Thus, full power can be obtained also at high speeds of the asynchronous machine.

The invention will be described by way of example with reference to the accompanying drawings, wherein.

Figures 1A, 1B:
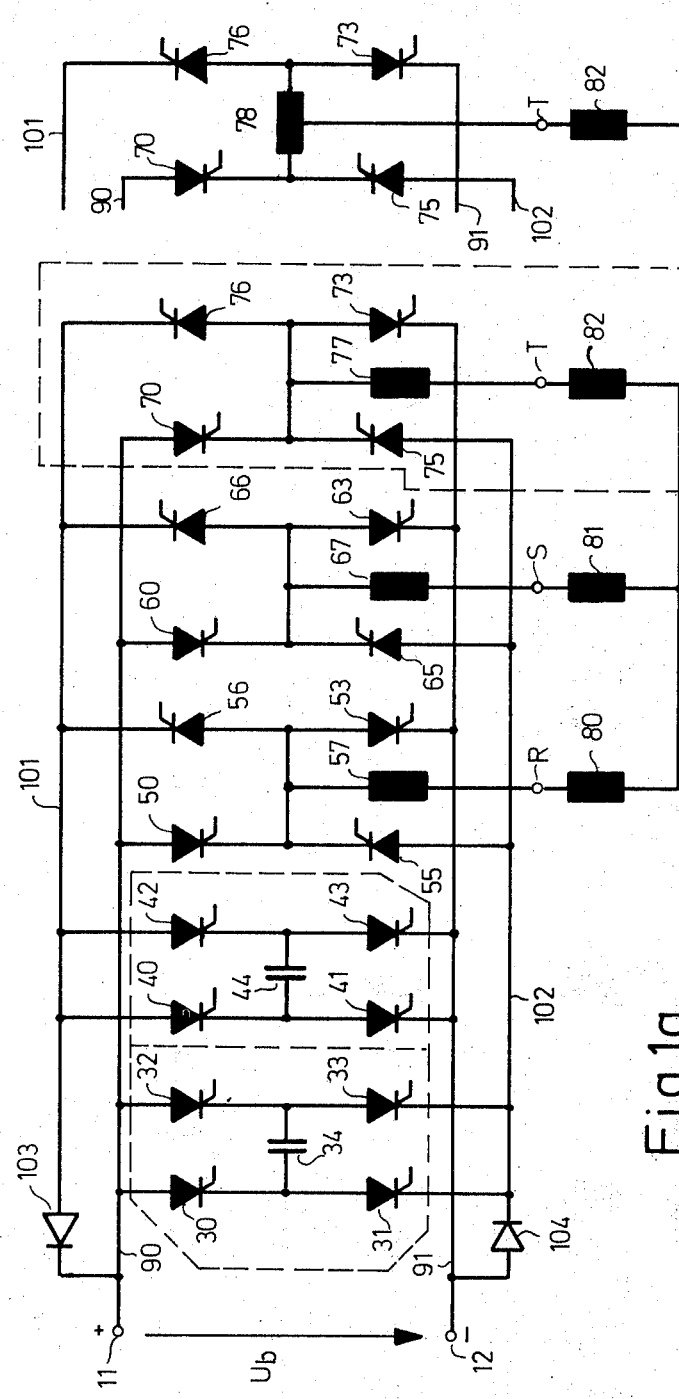
FIG. 1a illustrates, highly schematically, a circuit diagram of an embodiment of the present invention.
FIG. 1b is a fragment of the circuit diagram of FIG. 1a, and illustrates another embodiment.

The d-c supply is connected to the positive and negative terminals 11, 12, which may be connected, for example, to a battery or, if the inverter is part of a rectifier-inverter system, to a rectifier. The supply voltage is indicated by Ub. Positive bus 90 is connected to positive terminal 11. A return feed line 101 is arranged in parallel to positive bus 90, and connected thereto by means of a diode 103. Similarly, negative bus 91 is connected directly to negative terminal 12; a negative return bus 102 is connected over diode 104 to the terminal 12.

A three-phase bridge circuit including six thyristors 50, 53; 60, 63; 70, 73 is connected between positive and negative buses 90, 91. The output terminals R, S, T are connected to diagonals over the bridge over inductances 57, 67, 77, respectively. Three armature windings 80, 81, 82 of a three-phase asynchronous dynamo electric machine are connected to terminals R, S, T, respectively. The remainder of the dynamo electric machine, field structure, rotor, and the like, for example a squirrel cage rotor, are not shown.

Six return feed thyristors 56, 55; 66, 65; 76, 75 are connected in anti-parallel relationship to the six thyristors 50, 53; 60, 63; 70, 73 of the bridge circuit. In accordance with a feature of the invention, these return feed thyristors are not connected with positive and negative buses 90, 91, but rather with the positive return feed bus 101, and the negative return feed bus 102, respectively.

A push-pull quenching bridge circuit A, including four thyristors 30, 31, 32, 33 is connected between positive bus 11 and the negative return feed line 102. This first quenching bridge extinguishes or quenches the first group, or set of thyristors 50, 60, 70, which is connected to positive bus 90. A second push-pull quenching bridge circuit A', including four thyristors 40, 41, 42, 43 and a commutating capacitor 44 is connected between negative bus 91 and positive return feed bus 101. The second quenching circuit is used to quench the second group or set of thyristors 53, 63, 73, which are connected to negative bus 91.

FIG. 1b illustrates a slightly different embodiment of the power circuit to supply the phases R, S, T. Three circuits of this type would replace the power supply circuits, only one of which is shown in FIG. 1b, that is, to replace that portion of the circuit of FIG. 1a is within the dashed outline at the right of FIG. 1a. The thyristors 70, 73, and the return current thyristors 76, 75 are identical to those shown in FIG. 1a. The cathodes of thyristors 70, 75 are similarly connected, as well as the anodes of thyristors 76, 73. In contrast to the embodiment described in connection with FIG. 1a, however, a center tapped inductance 78 is connected between the anode of thyristor 73 and the cathode of thyristor 70. The phase connection, as shown in FIG. 1b phase T is connected to the center tap of inductance 78.

The other two branches of the three-phase bridge circuit would be similar to the illustration in FIG. 1b. The quenching circuits A, A' can be identical to that described in FIG. 1a.

Operation, with reference to FIG. 1a: Let it be assumed that phase R should have positive current applied. Thyristors 50, 63 are fired (by a suitable network, not shown). A closed circuit will exist from positive bus 90 over thyristor 50, inductance 57, armature winding 80, over the second armature winding 81, inductance 67, thyristor 63, to negative bus 91. The cathode of thyristor 50, in this instance is at a voltage close to that of positive bus 90.

Let it be further assumed that the commutating capacitor 34 of the first quenching bridge A is so charged that its right electrode has a positive potential thereon. The voltage of the commutating capacitor 34 is then approximately equal to that of the battery voltage $U_b$ across terminals 11, 12. If the thyristor 50 is to be quenched, then the two thyristors 30, 33 of the first quenching circuit A are higher. The left electrode of the commutating capacitor 34 is thereby connected to positive bus 90. Simultaneously, the return feed thyristor 55 must be fired, so that the right electrode of capacitor 34 is connected over the thyristors 33, 55 with the cathode of thyristor 50. The quenching network of the thyristor 50 is closed over positive bus 90, thyristor 30, capacitor 34, thyristors 33, 55. The commutating capacitor 34 dischages. At the beginning of this discharge cycle, the cathode of thyristor 50 is at a voltage which is more positive, almost by battery voltage $U_b$, than that of positive bus 90, and corresponding also to the charge voltage on capacitor 34. This quenches or extinguishes thyristor 50. After thyristor 50 has been quenced or extinguished, commutating capacitor 34 is charged over the still conductive thyristors 30, 33 in such direction that its left electrode will be at positive voltage. As soon as the commutating capacitor 34 is completely charged, no more voltage is across the two thyristors 30, 33 of the bridge A, which blocks these thyristors. Current through thyristor 55, inductance 57, windings 80, 81 of the dynamo electric machine, inductance 67 and thyristor 63 can continue to flow after extinction of the thyristor 50 over line 102 and a diode 104. If subsequently thyristors 50, 60, 70 should be extinguished then the two thyristors 32, 31 in the first quenching network A must be fired, in order to provide positive charge to the cathode of the respective thyristor 50, 60, 70.

The two diodes, 103, 104 assume the current which arises if the dynamo electric machine operates under dynamic braking, that is, provides a return feed to the terminals 11, 12. The dynamic braking current flows thus over lines 101, 102, as well as over diodes 103, 104. In dynamic braking mode of operation, both diodes 103, 104 are simultaneously conductive. The diodes 103, 104 also carry the return flow of current stored in the inductance of the system after one of the thyristors 50, 53; 60, 63; 70, 73 has blocked. This current decays exponentially, since the magnetic energy stored in the armature windings 80, 81, 82 can be dissipated only gradually. After the thyristor 50 has been quenched, as above described, a return flow current can flow over the network formed by the windings 80, 82, inductance 77, thyristor 73, negative bus 91, and diode 104, return feed bus 102, return feed thyristor 55, and inductance 57. Such a return flow of current then will flow only over one of the two diodes 103, 104.

Inductances 57, 67, 77 provide smoothing of higher harmonics and filtering of such harmonics from the supply source 11, 12, which are derived from the asynchronous dynamo electric machine. Harmonics necessarily arise when the supply voltage is provided in pulses by firing of thyristors. Inductances 57, 67, 77 may be omitted if the leakage inductance of the dynamo electric machine itself is sufficiently great in order to provide effective filtering. This permits simplification of the circuit illustrated in FIG. 1a.

Upon extinguishing a thyristor 50, a voltage will arise at the cathode of the thyristor 50 after firing of the return feed thyristor 55 which, with reference to the negative bus 91, is almost twice that of battery voltage $U_b$. This voltage is also applied to the anode of thyristor 53 which is blocked at this instant of time. Similar voltage relationships arise in the other thyristors 50, 60, 70; 53, 63, 73, so that the power thyristors which supply the windings to the dynamo electric machine must be designed for a blocking voltage which is at least twice that of the battery voltage $U_b$. Such devices are expensive if high battery voltages are used, and are difficult to make and to obtain, particularly since the thyristors simultaneously should have a very short recovery time.

The embodiment of FIG. 1b is suitable particularly when high operating voltages $U_b$ are used. The inductance 78 utilized to filter harmonics is so connected that it simultaneously forms a low pass filter which suppresses voltage peaks which arise at the beginning of the quenching cycle at the cathode of thyristor 70 and prevents application of these peaks to the anode of the thyristor 73. Return feed thyristors 76 and 75 are fired simultaneously. The thyristors 70, 73, 60, 63, 50, 53 then may be dimensioned for lower blocking voltages. The operation of the circuits is similar to that described in connection with FIG. 1a.

Figure 2:
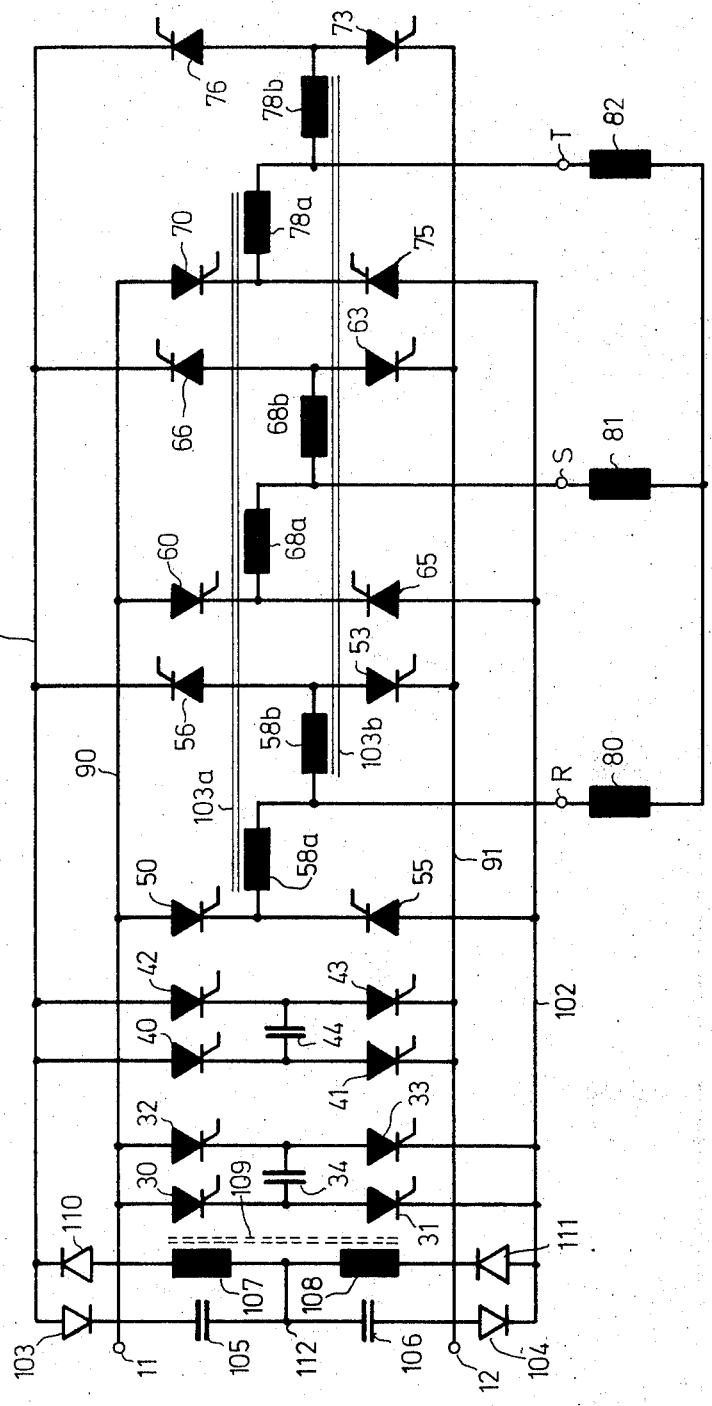
FIG. 2 illustrates yet another embodiment of a circuit of the present invention.

Embodiment of FIG. 2: The circuit, essentially, is similar to the circuit of FIG. 1b, and similar elements operating similarly have been given the same reference numerals, and will not be described again.

The inductance 78 of FIG. 1b is replaced by the example of FIG. 2 by two serially connected inductances 78a, 78b which are connected between the cathode of the thyristor 70 and the anode of the thyristor 73. Similar series inductances 58a, 58b, 68a, 68b are provided in the other branches of the three-phase bridge circuit. The three-phases R, S, T are connected to the junction of the inductances having subscripts a, and b, respectively. Thyristors 50, 60, 70, have their cathodes connected to the inductances 58a, 68a, 78a. These inductances 58a, 68a, 78a are wound on the common iron core 103a. Similarly, the inductances 58b, 68b, 78b connected to the anodes of thyristors 53, 63, 73 are wound on the common core 103b.

The positive return feed line 101, and the negative return feed lines 102 are connected by a series circuit which includes, in this sequence: a diode 110, an inductance, or choke 107, an inductance or choke 108, and a diode 111. Further, a pair of capacitors 105, 106 are connected between the diodes 103, 104. The junction point 112 of the capacitors 105, 106 is connected to the junction point of the inductances 107, 108. The two inductances 107, 108 can be wound on a common core 109, as indicated by the dashed line.

The inductance 78, in the example of FIG. 1b acts simultaneously as an inductive impedance for the current flowing into the phase T. Above the nominal speed of the dynamo electric machine, the power available at the motor decreases with increasing speed. In the third example of FIG. 2, however, only the leakage inductance between the inductances 58a, 68a must be remagnetized upon commutation of the current from thyristor 50 to thyristor 60; the magnetization of the main inductivity, that is, of core 103 remains. In the third example, therefore, the inductances 58, 68, 78 act only as inductive impedances for the sum of the phase currents. This sum is roughly constant at high speeds. Thus, with increasing speed the inductances will no longer cause a drop in power.

The two cores 103a, 103b may be two branches of a U-shaped, or O-shaped core. It is only important that the magnetic coupling between the windings on a single core 103a, or 103b, respectively, is tight; the coupling between the two inductances can be low, and separate cores may be used.

The circuit including capacitors 105, 106 and the series connection of inductances 107, 108 and the two diodes 110, 111, in the third example, provides for complete charging of the commutating capacitors 34, 44 already before the asynchronous machine is started. In the examples of FIG. 1a and FIG. 1b, the charging voltage of the commutating capacitors 34, 44 depends, immediately after connection of the circuit, on the motor current, since the diodes 103, 104 are poled in blocking direction, and the charging current of the commutating capacitors must flow over the asynchronous dynamo electric machine.

In the third example, that is in FIG. 2, two thyristors each, of the two quenching bridges are fired already before thyristors 50, 60, 70 are fired. Let it be assumed that the two thyristors 30, 33 are fired; charge current will flow from the junction 112 over inductance 108, diode 111 and thyristor 33 to commutating capacitor 34. The network is closed over the second fired thyristor 30 and capacitor 105. Since the junction point 112 is at a voltage which is about half of battery voltage $U_b$, commutating capacitor 34 would be charged only to half operating voltage if inductance 108 would not be provided. During the time that charging current flows, magnetic energy is stored in inductance 108. This stored energy provides further flow of charging current after the commutating capacitor 34 has been charged to half of battery voltage. In other words, the series tank circuit formed by capacitor 34 and inductance 108 reaches a peak which is higher than the supply, and can be so dimensioned that the capacitor is at least approximately charged to a voltage corresponding to battery voltage $U_b$. Diode 111, poled in blocking direction, suppresses any return flow of current and, upon the next half cycle, no further oscillation or discharge of the capacitor is possible.

The two capacitors 105, 106 provide an artificial center point for the battery voltage $U_b$. If the supply voltage $U_b$ is a battery with a center tap, then capacitors 105, 106 can be omitted, and the junction point 112 can be directly connected to the center tap of the battery. There is no change in the operation of the circuit.

Inductance 107 and diode 110 are utilized to charge the second commutating capacitor 44. The two inductances 107, 108 are preferably wound on the same core 109, in order to ensure that the charge current of the two commutating capacitors 34, 44 can flow for an equally long period of time, so that the charge voltages on the two capacitors will be essentially equal.

The elements 105 to 111 ensure in the embodiment of FIG. 2 that the commutating capacitors 34, 44 are fully charged as soon as the asynchronous dynamo electric machine is started, that is, as soon as the circuit is connected, thereby ensuring that all thyristors will reliably extinguish also upon starting of the dynamo electric machine, or connection of the circuit.

Various changes can be made within the scope of the inventive concept, and embodiments described in connection with any one Figure may be used appropriately in connection with other described embodiments.

I claim:

1. Multi-phase thyristor inverter circuit to supply multi-phase a-c output at output terminals (R, S. T) from a d-c supply (11, 12) comprising
   a first group of thyristors (50, 60, 70); a second group of thyristors (53, 63, 73), each group having one thyristor terminal connected to a respective terminal of the d-c supply and the other terminals, each, being connected to the phase output terminals (R, S. T) of the inverter circuit;
   common quenching circuits (A, A') for all the thyristors of a group;
   a positive return feed line (101);
   a negative return feed line (102);
   a diode (103, 104), each, connecting the respective positive return feed line (101) to the positive terminal (11) of the d-c supply and, respectively, the negative return feed line (102) to the negative terminal (12) of the d-c supply;
   a first group of return feed thyristors (56, 66, 76);
   a second group of return feed thyristors (55, 65, 75);

the return feed thyristors of each group being connected between the ouput phase terminals (R, S, T) and the positive, and negative return feed lines respectively; and
   a set of two serially connected inductances (58a, 58b; 68a, 68b; 78a, 78b), the junction between the serially connected inductances being connected to the phase output terminals (R, S, T);
   one of the serially connected inductances, each, of the set being connected to the cathodes of the first group of thyristors (50, 60, 70), and the other terminal of the other inductance (58b, 68b, 78b) being connected to the anodes of the second group of thyristors (53, 63, 73).

2. Inverter circuit according to claim 1 wherein the inductances (58a, 68a, 78a) connected to the cathodes of the first group of thyristors (50, 60, 70) are wound on a common core (103a);
   and the inductances (58b, 68b, 78b) connected to the anodes of the thyristors of the second group (53, 63, 73) are wound on a common iron core (103b).

3. Inverter circuit according to claim 2 wherein the common cores (103a, 103b) are the legs of a U-core.

4. Inverter circuit according to claim 1 wherein the quenching circuits (A, A') comprise
   a first quenching bridge including four quenching thyristors (30, 31, 32, 33) and a commutating capacitor (34) connected across the bridge, the other diagonal of the bridge being connected between the positive d-c supply terminal (11) and the negative return feed line (102);
   and a second quenching bridge including four further quenching thyristors (40, 41, 42, 43) and a commutating capacitor (44) connected across a diagonal of the bridge, the other diagonal of the second bridge being connected between the negative terminal (12) of the d-c supply and the positive return feed line (101).

5. Inverter circuit according to claim 1 wherein the quenching circuits comprise a first quenching circuit for the first group of thyristors connected between the positive terminal of the d-c supply (11) and the negative return feed line (102), and a second group of quenching circuits (A') connected between the negative terminal of the d-c supply (12) and the positive return feed line (101);

and said quenching circuits include energy storage means storing energy with a polarity counter the polarity of conduction of the thyristors which are to be quenched, and trigger means to discharge the energy storage means and apply a counter potential to the thyristor to be quenched.

6. Inverter circuit according to claim 1 wherein two quenching circuits (A, A') are provided, one each being connected between a respective terminal of the d-c supply (11, 12) and the oppositely poled return feed line (102, 101).

7. Inverter circuit according to laim 6 further comprising a series circuit of a diode (110), two inductance means (107, 108) and a second diode (111) connected between the positive and negative return feed lines (101, 102) said diodes being poled in blocking direction.

8. Inverter circuit according to claim 7 further comprising two capacitors (105, 106) connected, in series, between the positive and negative terminals of the d-c supply, (11, 12), the common junction of said capacitors forming an artificial center for the battery supply;

and means connecting the junction of said two serially connected inductance means to said artificial center.

9. Inverter circuit according to claim 7 wherein the d-c supply is a three terminal supply having a center connection between the positive and negative terminal;

and wherein the junction (104) between said two inductance means (107, 108) is connected to sad center terminal.

10. Inverter circuit according to claim 7 wherein said inductance means (107, 108) are wound on a common core.

11. Inverter circuit according to claim 1 in combination with an asynchronous dynamo electric machine, the phase terminals of the armature windings (80, 81, 82) of the dynamo electric machine being connected to the phase output terminals (R, S, T) of said inverter circuit.

12. Inverter circuit and dynamo electric machine combination as claimed in claim 11, wherein the inverter circuit converts d-c to three-phase a-c, and the dynamo electric machine is a three-phase asynchronous motor capable of operating in motor, or dynamic braking, or generation mode.

* * * * *